June 6, 1933.   J. GLASER   1,912,836
LAWN MOWER
Filed Sept. 3, 1931   3 Sheets-Sheet 3

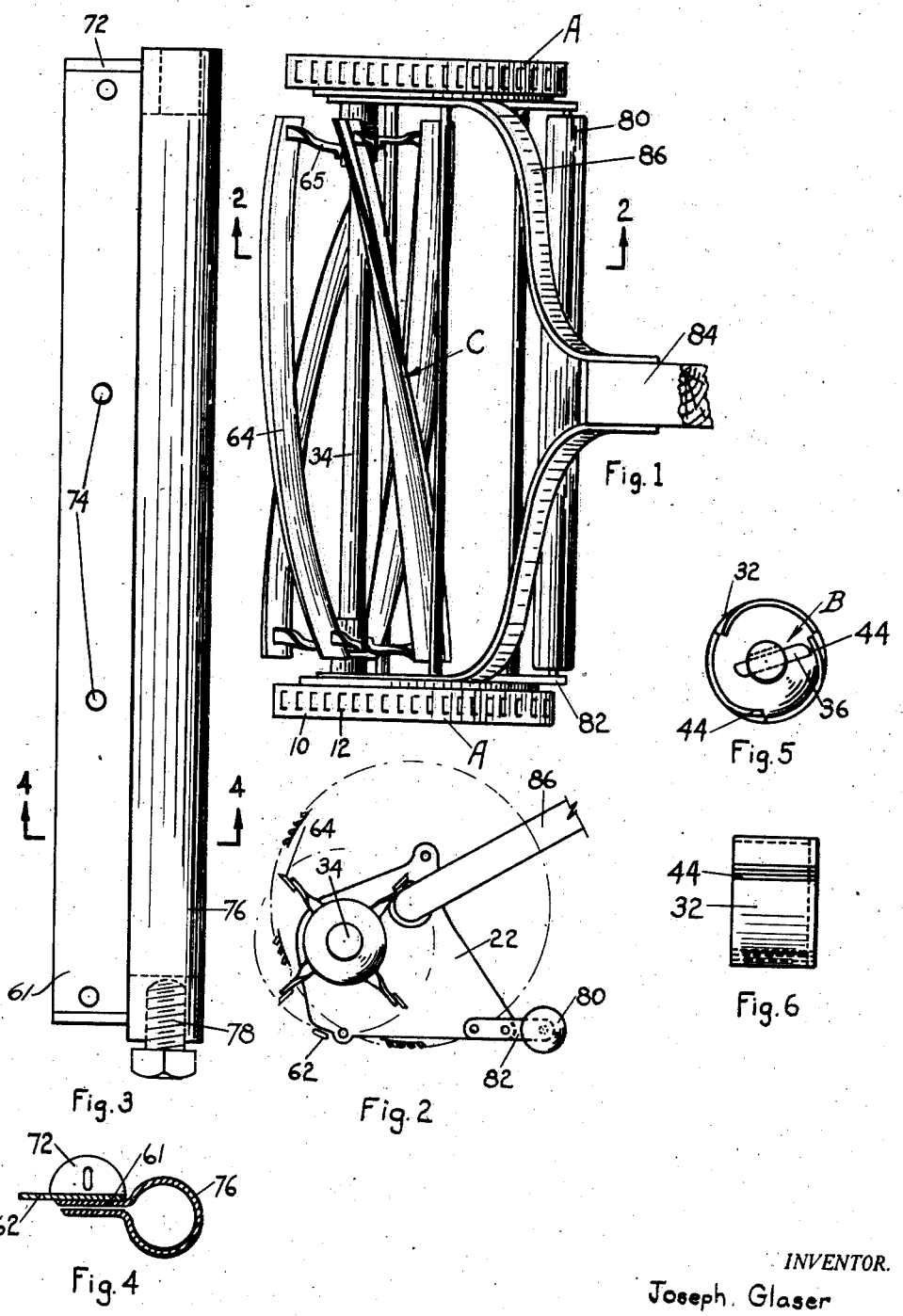

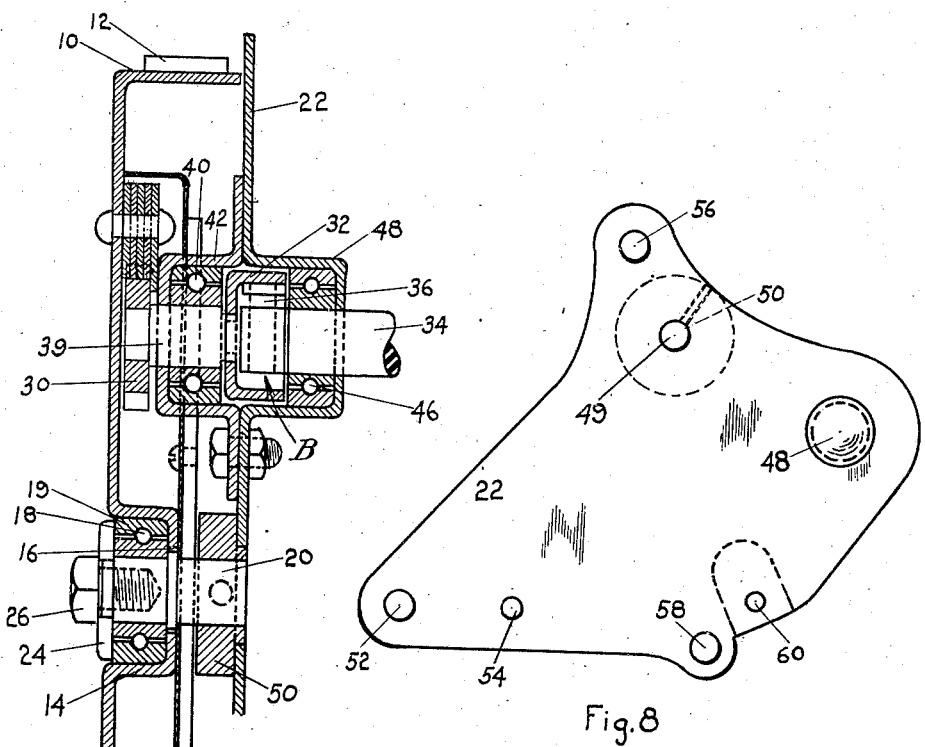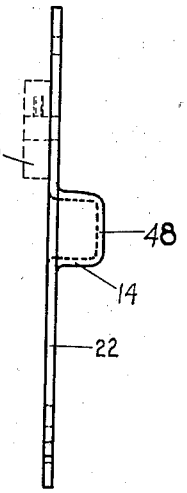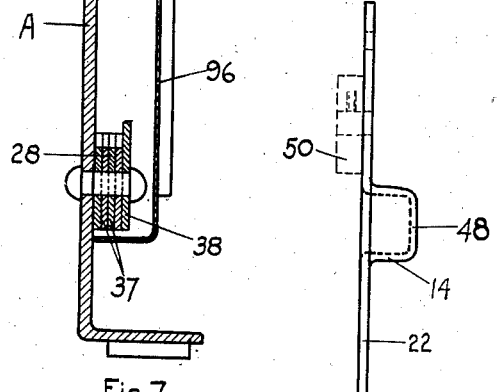

INVENTOR.
Joseph Glaser
BY Harry Sangsam
HIS ATTORNEY.

Patented June 6, 1933

1,912,836

UNITED STATES PATENT OFFICE

JOSEPH GLASER, OF PHILADELPHIA, PENNSYLVANIA

LAWN MOWER

Application filed September 3, 1931. Serial No. 560,964.

My invention relates to a machine for cutting grass on lawns or golf courses and relates particularly to machines generally known as "lawn mowers".

Heretofore, most parts of lawn mowers have been made of cast iron with the result that the average weight of a twelve-inch mower is approximately thirty-two pounds. By making all parts of my mower of stamped metal sheeting I am able to reduce the weight of a twelve-inch mower to approximately seventeen pounds without decreasing its efficiency, or wearing qualities, thereby reducing the exertion required to operate the mower so that a weaker person may operate the mower, or the mower may be operated longer without fatigue.

An object of my invention is to construct a light weight lawn mower which is made entirely of stamped metal sheetings.

Another object of my invention is to provide the stamped metal wheels of my mower with stamped out treads to prevent slippage due to the light weight of the mower.

Another object of my invention is to provide an internal driving gear made up of a plurality of stamped pieces which when fastened together and when oiled or greased retains the oil and grease between the section of stampings. This provision of a grease or oil reservoir reduces the friction between the driving gear and the driven pinion, and permits operation with less frequent lubrication.

Another object of my invention is to provide stamped gears that are more accurate than cast teeth gears and which will operate the mower noiselessly.

Another object of my invention is to provide a rotating cutter at the forward portion of the mower.

With these objects in view I provide a lawn mower comprising ground wheels of stamped metal sheeting, stamped metal side plates, stamped metal gears, stamped metal stationary blade cutters and a stamped rotary blade carrier, at the forward end.

In addition to the reducing of weight of my mower by using stamped metal portions I spot weld various portions wherever there is no need to break the weld in order to oil or repair the various parts. The welding not only reduces the weight but also provides a stronger construction.

Other objects of my invention are to provide an improved device of the character described, that is easily and economically produced, sturdy in construction and having a maximum efficiency. With these and related objects in view my invention consists in the following details of construction and combination of parts, as will be more fully understood from the following specifications, taken in conjunction with the accompanying drawings in which:

Fig. 1 is a plan view of my lawn mower;

Fig. 2 is a sectional view taken on the line 2—2 of Fig. 1;

Fig. 3 is a plan view of the stationary blade holder;

Fig. 4 is a sectional view taken on the line 4—4 of Fig. 3;

Fig. 5 is a front elevational view of the rotating blade operating ratchet wheel clutch;

Fig. 6 is a side view of the rotating blade operating ratchet wheel clutch;

Fig. 7 is a sectional view taken along the axis of the ground or supporting wheel and including the clutch mechanism;

Fig. 8 is an elevational view of the side plate which may be stamped for use as a right or left hand;

Fig. 9 is a side elevational view of the side plate;

Figure 10:
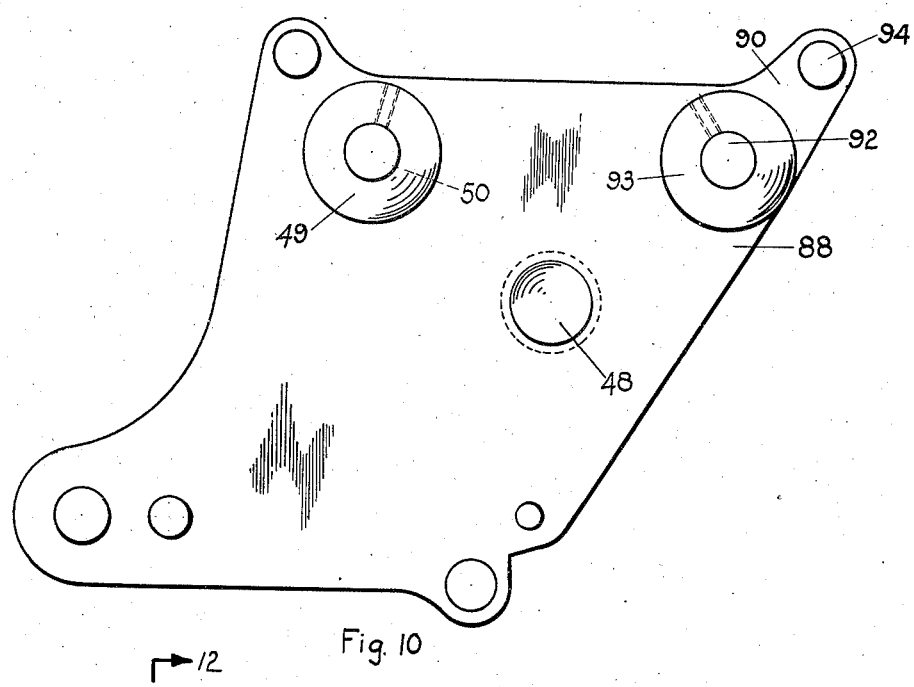
Fig. 10 is an elevational view of a modified form of side plate to provide a longer cutter and/or a guard.

Referring to the drawings, I show a lawn mower composed of ground or supporting wheels, generally designated as A; rotating blade driving mechanism and clutch generally designated as B and blade cutters C positioned at the forward direction of the mower.

The ground or supporting wheels A are each constructed of a single metal stamping, having its outer edge shaped to form a tread or extension 10 parallel to the axis of the wheel with stamped projections 12 on the tread to grip the earth or ground over which the mower is moved and to prevent slipping.

The central portion 14 of the wheel A is stamped to form a circular inward recess with an opening 16 at its center so that the wheel A may rotate freely on and provide support for a ball bearing 18. The portion 14 has pressed therein a bearing box 19 so that the box 19 will not come out.

A stud shaft 20 rigidly attached to a side plate 22 has at its free end ball bearings 18 upon which the wheel A rotates. A washer 24 holds the ball bearings within the ball bearing recess 14 by means of a bolt 26.

The rotating blade driving mechanism and clutch B is composed of an internal shrouded annular driving gear 28, a pinion 30, an annular cup shaped stamped metal ratchet wheel 32, and a blade shaft 34 carrying a slidable engaging pin 36. The annular driving gear 28, is built of a plurality of thin stampings 37 having a stiffening ring 38 at the side of the teeth of the gear 28, positioned to form a unitary shrouded gear structure, and is rigidly attached to the body of the ground wheels A. The stiffening ring 38 is slightly wider than the width of the gear 28 to prevent the burring of the gear teeth. When the annular gear 28 is greased or oiled some of the grease or oil will seep between the plate stampings 37, the stampings thereby functioning as a lubricating reservoir and facilitate the easy running of the mower. The case hardened machine steel driven pinion 30 is positioned upon one end of the pinion shaft 39 to engage the teeth of the driving gear 28. The pinion shaft 39 is journaled at its center upon ball bearings 40 which are carried within the stamped bearing housing 42, that is secured to the side plate 22, and also carries the annular ratchet 32. To prevent undue wear the ratchet 32 and the pin 36 are "case" hardened before assembly. A rotating blade shaft 34, in line with the pinion shaft 39, is journaled in ball bearings 46 which are carried in a stamped circular recess 48 of each of the side plates 22. The slidable engaging pin 36 is fitted into one end of the blade shaft 34 in such manner that it may be reciprocated perpendicularly to the axis of the shaft 34. The slidable engaging pin 36 acts as a pawl to the annular ratchet 32 and permits relative rotation in one direction only, the pin being so shaped that full freedom of motion is obtained in one direction without the objectionable noise of an ordinary ratchet.

It is obvious when the cutters rotate faster than the pinion then the teeth 44 of the annular ratchet do not engage the slidable engaging pin but the pin 36 slides about the inside of the annular ratchet.

The side plate 22, Figures 8 and 9, is a metal stamping and has at its forward end a stamped circular recess 48 into which the cutter shaft 34 is supported. At the central upper portion of the plate is an opening 49 for the wheel stub 20 having a welded boss 50. At the lower rear section of the plate is a circular opening 52 and adjacent thereto is another opening 54, for the roller support. Openings 52 and 56 are for tie rods, and openings 58 and 60 are to locate the stationary blade holder 61.

Figures 11, 12:
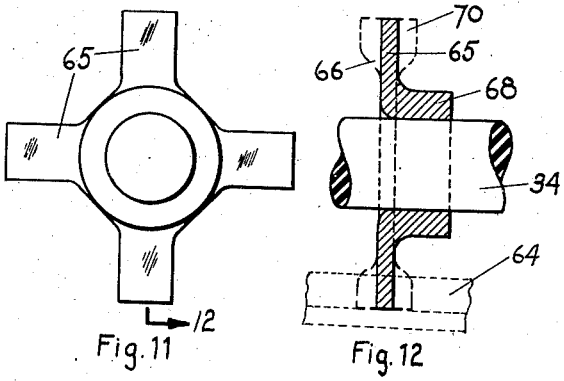
Fig. 11 is a front elevational view of the blanked rotary blade holder.
Fig. 12 is a sectional view taken on the line 12—12 of Fig. 11.

The rotary blade assemblage C consists of a plurality of rotating cutting blades 64, and an adjustable stationary cutting blade 62. Mounted upon the rotating shaft 34 are a plurality of blade holders 65, Figures 11 and 12, which are drawn blanked out and twisted at 66 by means of a stamping press. The blade holder 65 is welded to the shaft 34 at its end 68, to insure rigidity, ease of manufacture and lightness in weight.

Rotating cutting blades 64 are cold twisted and are attached to the free end 70 by means of rivets.

The tapped hole 60 in the side plate 22 locates an ear or extension 72 of the stationary blade holder 61. The blade holder 61 is stamped from sheet metal and at the front has rivet holes 74. The rear elongated side 76 of the blade holder is bent in the form of a circle for strengthening purposes and to enable a plug 78 to be inserted and welded at each end of the circular side 76. The plug 78 after being welded in place is then tapped.

The stationary blade holder is rockably supported by suitable pivots afforded bearing in the holes 60 of the side plate and it is adjustable in an upward or downward direction, relative to the blades of the rotary cutting reel, through the medium of screws afforded guidance in the tapped apertures 60.

A ground roller 80 is attached to the side walls 22 by an extension 82. Retaining means passing through the openings 50 and 52 of the side walls 22 and through the extension 82 rigidly retain the roller in position. An elongated opening in the extension 82 provides for the elevating or depressing of the roller.

A handle 84 having attaching arms 86 is of the customary construction.

In Figure 10, I show a modified form of side plate 88 similar to plate 22 with the exception that an extension 90 is at the forward end of the plate 88. The extension 90 has an opening 92 and a boss 93 welded hereto for the ground wheel stud and an opening 94 for the tie rod. The hollow tie rod through opening 94 acts as a guard when the wheels are inserted in the rear opening 49 of the side plate, thus making a short mower to economize on space. A forward or rearwardly extending rotary wheel is thus placed at the option of the user.

Since the driving and driven gears together with their covering 96 are placed within the space occupied by the tread of the wheel, it is to be noted that the width of my mower is greatly reduced.

Although the invention has been described in considerable detail such description is intended as illustrative, rather than limiting, as the invention may be variously embodied, and the scope of the invention is to be determined as claimed.

I claim:—

1. In a lawn mower, a plurality of ground wheels each of a unitary structure, the edge of each wheel projecting to form a tread, projections extending outwardly on said tread, an annular driving gear mounted upon each of said wheels, said driving gear being composed of a plurality of similar gear elements attached to form a unitary structure and oil reservoir, a driven pinion operatively engaging said driving gear and mounted upon a pinion shaft, said pinion shaft rotatably mounted on roller bearings located in a side plate, said pinion shaft also carrying a ratchet clutch wheel, said ratchet wheel having a plurality of teeth therein, a rotary blade cutter shaft located in the same plane as the pinion shaft, said rotary shaft having a slidably mounted pin therein to engage the ratchet clutch teeth only when moved in one direction, cutting blades mounted upon said blade cutter shaft, said blades located at the forward end of said mower, a stationary cutter mounted beneath said rotary blade shaft and reinforcing means for holding said side plates.

2. In a lawn mower, supporting wheels and rotatable cutters, side plates supporting the wheels and rotatable cutters, a blade holder composed of a stamped metal sheeting and having at its forward end means so that a cutter may be attached thereto, the rear side of said blade holder being of circular cross section and plugs at each end of said circular portion, said plugs welded therein for strengthening and fastening purposes, and means to retain the forward side of the blade-holder rigidly in position.

3. In a lawn mower, a plurality of ground wheels, side frames, a gear mounted on each ground wheel, a pinion operatively engaging said gear and mounted upon a pinion shaft, bearings mounted in said side frame or supporting said pinion shaft, a cup-shaped ratchet clutch having its edge projecting inwardly at spaced intervals to form teeth, said cup-shaped clutch mounted adjacent to said pinion shaft, a shaft adapted for carrying blade cutters, a key slidably mounted at one end of said blade carrying shaft engaging the ratchet clutch in order to revolve said blade cutter shaft.

4. In a lawn mower, a plurality of ground wheels, side plates from which said ground wheels are supported by means of a stub shaft rigidly fastened to a welded stub shaft support on said side plate, a bearing container of cup-shaped construction on each of said side walls to hold bearings for a rotatable blade shaft and for a pinion, said pinion driven from a driving gear operatively connected to said ground wheels, and means to retain said bearings.

5. In a lawn mower, the combination of a plurality of rotatable cutters, a plurality of ground wheels, a shrouded internal driving gear mounted on each of said ground wheels, a pinion operatively engaging each of said gears, a plurality of side frames, a pinion shaft mounted on each of said frames, clutch means mounted on said pinion shaft operatively connecting said rotatable cutters, and means to disengage said rotatable cutters from said clutch when said cutters rotate faster than said pinion.

6. In a lawn mower, the combination of a plurality of ground wheels, rotatable cutters, an internal driving gear mounted on each of said ground wheels, a pinion operatively engaging each of said gears, a plurality of side frames, a pinion shaft mounted on each of said frames, clutch means mounted on said pinion shaft operatively connecting said rotatable cutters, said ground wheel comprising in a body of the wheel a tread extending at right angles to said body, projections on said tread to grip the ground, a circular inward recess in the center portion of said wheel to form a bearing container, and bearings in said recess.

7. In a lawn mower, the combination of a plurality of ground wheels, rotatable cutters, means operably connected for driving said cutters from said wheels, a plurality of side frames and said ground wheel comprising in a body of the wheel a tread extending at right angles to said body, projections on said tread to grip the ground, a circular inward recess in the center of said wheel to form a bearing container, and bearings in said recess, an axle rotatably mounted in said bearings and supported from said side frames.

In testimony whereof I affix my signature.

JOSEPH GLASER.